(12) United States Patent
Matsumura et al.

(10) Patent No.: US 9,544,471 B2
(45) Date of Patent: Jan. 10, 2017

(54) PRINT CONTROL APPARATUS, PRINT CONTROL METHOD, AND PRINT CONTROL PROGRAM

(71) Applicant: SEIKO EPSON CORPORATION, Tokyo (JP)

(72) Inventors: Tetsuya Matsumura, Nagano (JP); Naoki Sudo, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/476,165

(22) Filed: Sep. 3, 2014

(65) Prior Publication Data
US 2015/0062227 A1 Mar. 5, 2015

(30) Foreign Application Priority Data
Sep. 4, 2013 (JP) ................................. 2013-182845

(51) Int. Cl.
*B41J 29/38* (2006.01)
*H04N 1/52* (2006.01)
*B41J 2/21* (2006.01)
*H04N 1/405* (2006.01)

(52) U.S. Cl.
CPC ............... *H04N 1/52* (2013.01); *B41J 2/2132* (2013.01); *H04N 1/4057* (2013.01)

(58) Field of Classification Search
CPC .... B41J 2/04551; B41J 2/0456; B41J 2/04593
See application file for complete search history.

(56) References Cited

U.S. PATENT DOCUMENTS

2005/0275675 A1* 12/2005 Kakutani ............... B41J 2/205
  347/15
2012/0212534 A1* 8/2012 Tanase ................... B41J 2/155
  347/15

FOREIGN PATENT DOCUMENTS

JP 2001-096768 A 4/2001
JP 2011-223520 A 11/2011

* cited by examiner

*Primary Examiner* — Matthew Luu
*Assistant Examiner* — Tracey McMillion
(74) *Attorney, Agent, or Firm* — Global IP Counselors, LLP

(57) ABSTRACT

A print control apparatus is configured to control a print head adapted to discharge ink droplets of a plurality of sizes to execute printing. The print control apparatus includes a print control unit configured to acquire a gradation value of an ink color based on image data and to determine whether or not to discharge an ink droplet of one of the plurality of sizes based on the gradation value. The print control unit is configured to determine that the ink droplet to be discharged is the ink droplet of a first size or smaller when the gradation value belongs to a maximum value-side partial range including a maximum value, and to determine that the ink droplet to be discharged is only the ink droplet of the first size when the gradation value belongs to a range towards a minimum value-side than the partial range.

5 Claims, 6 Drawing Sheets

PRINT DATA 22
(AFTER STEP S130)

PRINT DATA
(AFTER STEP S150)

(Comparative Example)

PRINT DATA
(AFTER STEP S150)

PRINT CONTROL APPARATUS, PRINT CONTROL METHOD, AND PRINT CONTROL PROGRAM

CROSS-REFERENCE TO RELATED APPLICATIONS

This application claims priority to Japanese Patent Application No. 2013-182845 filed on Sep. 4, 2013. The entire disclosure of Japanese Patent Application No. 2013-182845 is hereby incorporated herein by reference.

BACKGROUND

Technical Field

The present invention relates to a print control apparatus, a print control method, and a print control program.

Related Art

Printers having print heads able to discharge ink droplets of a plurality of sizes are known.

Known as pertinent art is an image processing apparatus which, in accordance with an input for commanding a modification to a dot recording rate, modifies a dot recording rate table in which each of a plurality of dots of different sizes has a relationship of correspondence between density gradation values of image data and dot recording rates, which are proportions at which dots per unit area on a recording medium are formed (see Japanese laid-open patent publication No. 2011-223520).

SUMMARY

In instances of printing a so-called "solid image", which is when a certain region possessing a given breadth on a recording medium is printed so as to be filled in with ink, then the print quality is recognized as being poor when a blank section not covered with ink (enough of a blank section to be visible to a user) is present inside this region. Also, the ink droplets may sometimes strike the recording medium with slight deviation from the position where the ink droplets were originally meant to strike (i.e., there may sometimes be a striking error). A striking error can create a blank section that was not originally meant to be created.

An effective manner of suppressing the occurrence of such blank sections as much as possible is to make heavy usage of ink droplets of a greater size (ink droplets with which a broader region can be covered with one droplet) out of the ink droplets of a plurality of sizes.

Negative effects can also arise, however, from making heavy usage of the large-sized ink droplets. For example, between a case where an image is represented with ink droplets of a given size and a case where that image, at the same density, is represented with ink droplets of a smaller size than the given size, the latter case will have a greater number of ink droplets discharged onto the recording medium in order to reproduce the relevant image. For an image that is represented with relatively finer lines, such as with, for example, characters or the like, the ink droplets are correspondingly fewer in number when the image is reproduced by the larger-sized ink droplets, and therefore some of the lines constituting the characters may sometimes have voids. Such voids for a part of the characters have lowered the quality of text in terms of the result of printing.

As such, there has been a need for techniques for appropriately suppressing an image quality degradation that can occur in situations where it is desirable to use larger-sized ink droplets. The above-cited document was not intended to solve such a problem.

The present invention has been made in order to solve at least one of the above-described problems, and provides a print control apparatus, print control method, and print control program for contributing to improving the quality of the result of printing for when printing is performed using print heads able to discharge ink droplets of a plurality of sizes.

A print control apparatus according to one aspect is configured to control a print head adapted to discharge ink droplets of a plurality of sizes to execute printing, the print control apparatus comprising: The print control unit is configured to acquire a gradation value of an ink color based on image data, to determine whether or not to discharge an ink droplet of one of the plurality of sizes based on the gradation value, and to control discharging of the ink droplets by the print head in accordance with determination. The print control unit is configured to determine that the ink droplet to be discharged by the print head is the ink droplet of a first size or the ink droplet of a size smaller than the first size when the gradation value belongs to a maximum value-side partial range including a maximum value, and to determine that the ink droplet to be discharged by the print head is only the ink droplet of the first size when the gradation value belongs to a range towards a minimum value-side than the partial range.

According to this configuration, irrespective of the gradation values of the ink colors based on the image data, the possibility that ink droplets of the first size are discharged is allowed (the discharge of only ink droplets of the first size is allowed, in the extreme case where the gradation values belong to the range more to the minimum value side than the maximum value-side partial range). Therefore, the occurrence of the blank sections such as are described above is curbed. Furthermore, the ink droplets of the first size or ink droplets of a size smaller than the first size are discharged in a case where the gradation value belongs to the maximum value-side partial range. Therefore, when characters or the like are being printed, the characters are constituted of not only ink droplets of the first size but also ink droplets of a size smaller than the first size, and the result of printing yields high-quality characters substantially free of degradation (the "voids" described above).

In one aspect of the present invention, the print control unit is preferably configured to execute at least: a first discharge mode, for determining that the ink droplet to be discharged by the print head is the ink droplet of the first size or the ink droplet of the size smaller than the first size when the gradation value belongs to the partial range, and determining that the ink droplet to be discharged by the print head is only the ink droplet of the first size when the gradation value belongs to the range towards the minimum value-side than the partial range; and a second discharge mode, for determining that the ink droplet to be discharged by the print head is the ink droplet of the size smaller than the first size when the gradation value belongs to a second partial range further towards the minimum value-side including a minimum value. The first discharge mode is executed in a case of using a first recording medium resistant to ink droplet bleeding, and the second discharge mode is executed in a case of using the second recording medium, wherein the first recording medium and the second recording medium differ in how readily an ink droplet that has struck bleeds.

Then, the print control unit may execute the first discharge mode in a case of using a first recording medium resistant to ink droplet bleeding, out of a first recording medium and a second recording medium that differ in how readily an ink droplet that has struck can bleed, and execute the second discharge mode in a case of using the second recording medium.

In a recording medium resistant to ink droplet bleeding, an ink droplet that has struck does not spread easily and therefore the blank sections are more likely to occur. According to this configuration, the occurrence of the blank sections is appropriately suppressed and the quality of characters and the like is improved by executing the first discharge mode in a case of using the first recording medium, which is resistant to ink droplet bleeding. Executing the second discharge mode in a case of using the second recording medium, which is more prone to ink droplet bleeding (a kind of situation where the blank sections are less likely to occur) than the first recording medium, causes the ink droplets of a size smaller than the first size to be discharged in a low gradation-side range, thus yielding image quality with less graininess (conspicuousness of the dots) and richer tone.

The configuration may also be such that the print control unit executes the first discharge mode in a case of employing a first recording method where there is a greater number of discharges, out of a first recording method and second recording method that differ in the number of discharges of ink droplets per one scan of the print head, and executes the second discharge mode in a case of employing the second recording method.

A case of employing the first recording method, which has a greater number of discharges of ink droplets per one scan of the print head is a situation where the influence of turbulence of the air flow in the vicinity of the surface of the recording medium causes the ink droplets to be more likely to experience striking error, and therefore causes the blank sections to be more likely to occur. According to this configuration, the occurrence of the blank sections is appropriately suppressed and the quality of characters and the like is improved by executing the first discharge mode in a case of employing the first recording method. Executing the second discharge mode in a case of employing the second recording method, with which the blank sections are less likely to occur than the first recording method, causes the ink droplets of a size smaller than the first size to be discharged in a low gradation-side range, thus yielding image quality with less graininess (conspicuousness of the dots) and richer tone.

The configuration may also be such that the print control unit executes the first discharge mode in a case where only black ink is being discharged by the print head and executes the second discharge mode in a case where the black ink and a color ink other than the black ink are being discharged by the print head.

In a case where only black ink is being discharged by the print head (a case of monochromatic printing), then blank sections or voids in characters such as described above could be said to be more conspicuous. According to this configuration, the occurrence of the blank sections is appropriately suppressed and the quality of characters and the like is improved in a case where only the black ink is being discharged by the print head. Executing the second discharge mode in a situation where the black ink and a color ink other than the black ink are being discharged by the print head (where the conspicuousness of the blank sections or voids in characters are less likely to be problematic than a case of monochromatic printing) also causes the ink droplets of a size smaller than the first size to be discharged in a low gradation-side range, thus yielding image quality with less graininess (conspicuousness of the dots) and richer tone.

The technical concepts as in the present invention need not be realized only in the form of a print control apparatus, but rather may be embodied by other forms. It would also be possible to comprehend the invention of a method (print control method) comprising a step corresponding to the features of the print control apparatuses of any of the aspects described above, the invention of a print control program for causing a predetermined hardware (computer) to execute such a method, or the invention of a computer-readable storage medium in which such a program is recorded. The print control apparatus may be realized by a single apparatus or may be realized by the combination of a plurality of apparatuses.

BRIEF DESCRIPTION OF THE DRAWINGS

Referring now to the attached drawings which form a part of this original disclosure.

DETAILED DESCRIPTION OF EXEMPLARY EMBODIMENTS

The following is a description of embodiments of the present invention, with reference to the accompanying drawings.

1. Overview of the Apparatuses

Figure 1:
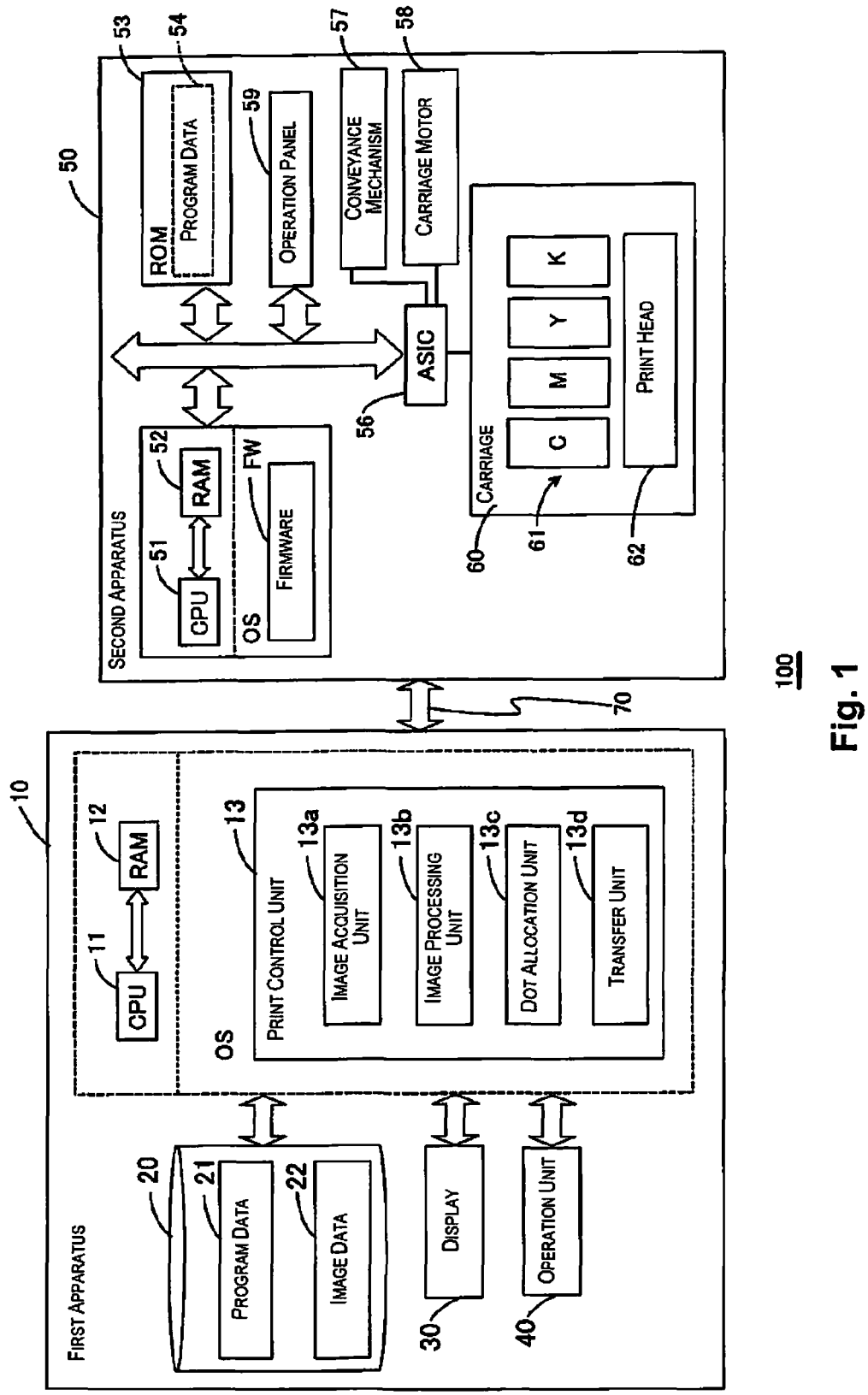
FIG. 1 is a drawing schematically illustrating a hardware configuration and software configuration as in the present embodiment.

FIG. 1 schematically illustrates a hardware configuration and a software configuration as in the present embodiment. In FIG. 1, a first apparatus 10 and a second apparatus 50 are illustrated. The first apparatus 10 has a function for controlling the second apparatus 50 and causing the second apparatus 50 to execute printing; for example, a personal computer (PC), server, mobile terminal apparatus, and the like would apply. The second apparatus 50 is a printer. A "printer" refers (JIS X0012-1990) to an output apparatus for making a hard copy recording of data, a principal form of which is columns of discrete graphic characters belonging to one or a plurality of previously established character sets. The second apparatus 50 only needs to be able to function as a printer, and may be a so-called multifunction peripheral that functions also as a scanner or copier.

The first apparatus 10 applies as one example of a print control apparatus. Alternatively, a system 100 comprising the first apparatus 10 and the second apparatus 50 may be understood to be the print control apparatus, or it would also be possible to understand only the second apparatus 50 to be a print control apparatus. Further, the first apparatus 10 and the second apparatus 50 are not to be presumed only to each respectively be an individual apparatus. The first apparatus 10 and the second apparatus 50 may be understood to apply as respective parts in a single, integrally configured product (printer), and the present embodiment also encompasses a configuration in which a part of this product functions as the first apparatus 10 and another part functions as the second apparatus 50.

In the first apparatus 10, a CPU 11 deploys program data 21 stored in a hard disk drive (HDD) 20 or the like to a RAM 12 and performs operations in conformity with the program data 21 in an OS, whereby a print control unit 13 (a print control program; for example, a printer driver) for controlling the second apparatus 50 is executed. The print control unit 13 causes the CPU 11 to execute respective functions of an image acquisition unit 13a, an image processing unit 13b, a dot allocation unit 13c, a transfer unit 13d, and the like. Each of these functions shall be described in greater detail below. In a case where the first apparatus 10 and the second apparatus 50 are configured integrally as a printer, then the print control unit 13 or the HDD 20 may be configured as a firmware (FW) (described below) or a memory such as a ROM 53 (described below), respectively.

Connected to the first apparatus 10 is a display 30 serving as a display unit; the display 30 displays a user interface (UI) screen needed for a variety of processes. The first apparatus 10 is provided as appropriate with an operation unit 40 achieved by, for example, a keyboard, mouse, or a variety of buttons, a touch pad, a touch panel, or the like, and instructions that are needed for respective processes are inputted via the operation unit 40 by the user. The display 30 and the operation unit 40 may be built into the first apparatus 10 or may be externally connected. The first apparatus 10 is communicatively connected to the second apparatus 50 via a transfer path 70. The transfer path 70 is a general term for an either wired or wireless communication pathway. In a case where the first apparatus 10 and the second apparatus 50 are an integrated product, as described above, then the transfer path 70 is a communication pathway within this product.

In the second apparatus 50, a CPU 51 deploys program data 54 stored in a memory such as a ROM 53 to a RAM 52 and performs operations in conformity with the program data 54 in an OS, whereby the firmware FW for autonomous control is executed. The firmware FW makes it possible to cause an ASIC 56 to execute printing based on print data that is transmitted from the first apparatus 10.

The ASIC 56 acquires the print data and generates a drive signal for driving, for example, a conveyance mechanism 57, a carriage motor 58, and a print head 62 based on the print data.

The conveyance mechanism 57 is provided with a paper feed motor or paper feed roller (not shown), and conveys a recording medium along a certain direction of conveyance by being driven and controlled by the ASIC 56. A "recording medium" refers to a material for holding a printed image, typically paper, but may be materials other than paper such as a plastic or fiber.

The second apparatus 50 is provided with, for example, a carriage 60, and the carriage 60 is loaded with a cartridge 61 for each of a plurality of types of ink. The example in FIG. 1 is loaded with cartridges 61 corresponding to a variety of liquids: cyan (C), magenta (M), yellow (Y), and black (Y). The specific types or number of inks used by the second apparatus 50 are not limited to what is described above; for example, it would be possible to use a variety of inks, such as light cyan, light magenta, orange, green, gray, light gray, white, metallic, and so forth. The cartridges 61 need not be loaded onto the carriage 60 but instead may be installed at a predetermined position inside the second apparatus 50, and the cartridges 61 may take the form of an ink tank, ink package, or the like.

The carriage 60 is provided with the print head 62, which jets (discharges) from a plurality of ink ejection holes (hereinafter, "nozzles") the inks that are supplied from each of the cartridges 61. Within the print head 62, piezoelectric elements for causing the ink (ink droplets) to be discharged from the nozzles are provided so as to correspond to each of the nozzles. The piezoelectric elements are deformed when the drive signal is applied, and cause the ink to be discharged from the corresponding nozzles. In the present embodiment, the print head 62 is capable of discharging ink droplets of a plurality of different sizes, in accordance with the drive signal, from the nozzles. That the sizes of the ink droplets are different signifies that the amount of ink per ink droplet is different. More specifically, the print head 62 is capable of discharging ink droplets of a largest size (L-sized ink droplets), ink droplets of the next largest size (M-sized ink droplets), and ink droplets of a smallest size (S-sized ink droplets). Here, instances of expression as "dots" basically refer to the ink droplets when in a state of having struck the recording medium. The expression "dots" may sometimes also be used, for the sake of explanation, in stages prior to when the ink droplets strike the recording medium. The L-sized ink droplets, M-sized ink droplets, and S-sized ink droplets may also sometimes be expressed as "large dots", "medium dots", and "small dots", respectively.

By controlling the driving of the carriage motor 58, the ASIC 56 causes the carriage 60 (and the print head 62) to move along a direction (main scan direction) intersecting with the direction of conveyance (i.e., to perform main scanning); the ASIC 56 also causes the print head 62 to discharge the inks from each of the nozzles, in association with this movement. This causes the ink droplets to adhere to the recording medium (causes the dots to be formed on the recording medium) and causes an image based on the print data to be reproduced on the recording medium. "Intersecting with" as stated above has the meaning of orthogonality. However, even "orthogonality" does not signify only being strictly orthogonal (90°), but instead has a meaning that comprises an error of angle of an extent that is acceptable for the quality of the product.

The second apparatus 50 is further provided with an operation panel 59. The operation panel 59 comprises a display unit (for example, a liquid crystal panel), a touch panel that is formed within the display unit, and a variety of buttons or keys, and accepts an input coming from a user, displays a required UI screen on the display unit, and so forth.

The second apparatus 50 is not limited to being a so-called serial printer where, as described above, the print head 62 moves along the main scan direction. For example, the second apparatus 50 may be a so-called line printer that has a head for line printers where a plurality of nozzle columns for each kind of ink, with which the nozzles are arranged side by side along the main scan direction, are aligned in parallel in the direction of conveyance. The means for causing the dots to be discharged from the nozzles, too, is not limited to being the above-described piezoelectric elements; instead, a means where the ink is heated by a heating element to cause the dots to be discharged from the nozzles may also be employed. The format of printing employed by the printer also need not be limited to an inkjet format such as described above, but rather may be a laser format or thermal format.

2. Print Control Process

The description relates now to a print control process (method) executed in the present embodiment, based on the above-described configuration.

Figure 2:
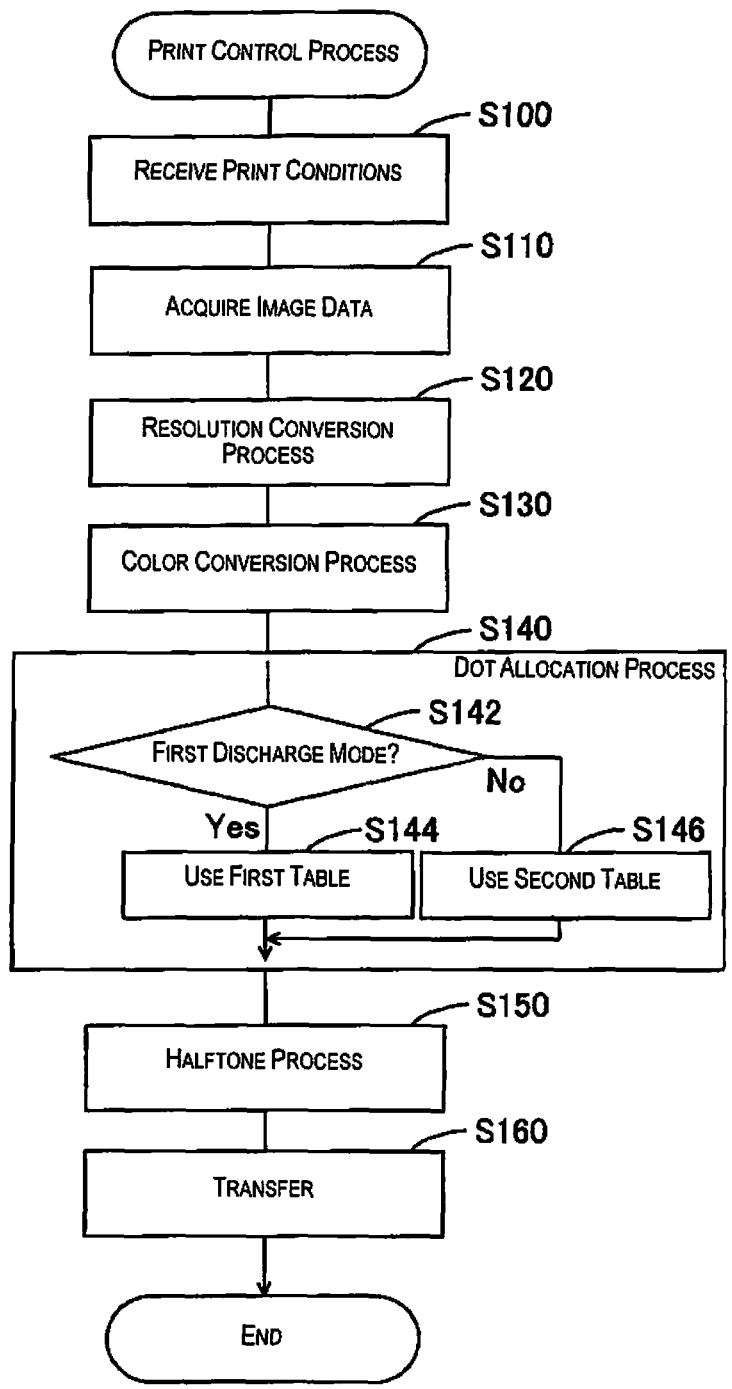
FIG. 2 is a flow chart illustrating a print control process (method)

FIG. 2 is a flow chart illustrating the print control process. The description here is with the understanding that in the first apparatus 10, the CPU 11 fulfills the function of the print control unit 13 and executes this flow chart.

In a step S100, the print control unit 13 receives settings for a variety of conditions (print conditions) relating to printing from the user, via the UI screen at which the user operates the operation unit 40 to cause the display 30 to be displayed. There are a variety of examples of print conditions, which could include the type of recording medium used for printing, the print resolution, or a selection between monochromatic printing or color printing. At least some of the settings received in the step S100 are consulted in a dot allocation process (step S140) described below.

A variety of settings, such as plain paper or glossy paper, can be made for the recording medium, but in the present embodiment, the recording medium is broadly classified as being either a recording medium prone to ink bleeding or a recording medium resistant to ink bleeding. Being prone to ink bleeding signifies that the ink droplets that have struck the recording medium spread more broadly thereon. In a case where the recording medium is prone to ink bleeding, even were there to be an error in the striking positions of the ink droplets, it would still be possible to curb the occurrence of a blank section that is caused by such a striking error. When a so-called solid image as described earlier is being printed, being prone to ink bleeding still has more improvement in the coverage rate of the recording medium surface by the ink, and the occurrence of blank sections that lower the image quality of the solid image can be suppressed. Cases where the recording medium is resistant to ink bleeding, however, can be said to be susceptible to the occurrence of such blank sections.

Out of the recording mediums that the user is able to select via the UI screen, the question of which recording mediums are prone to ink bleeding and which recording mediums are resistant to ink bleeding is understood to have been determined in advance. A distinction is made below by calling a recording medium resistant to ink bleeding a "first recording medium" and calling a recording medium prone to ink bleeding a "second recording medium".

The print resolution (dots per inch, DPI) includes the resolution in the main scan direction and the resolution in the direction of conveyance (a sub-scan direction). The resolution in the main scan direction is mainly dependent on the number of discharges of ink droplets (by one nozzle) per one scan (one main scan) of the print head 62. The number of discharges (hereinbelow, the "number of discharges during scanning") of ink droplets by one nozzle per one main scan of such description is dependent on the speed for main scanning (the speed of movement of the carriage 60), and on the number of discharges of ink droplets per unit time by the nozzles. The number of discharges of ink droplets per unit time (for example, one second) corresponds to the frequency of the drive signal applied to the piezoelectric elements provided so as to correspond to the nozzles, and therefore may also be expressed as a discharge frequency or the like. The resolution in the sub-scan direction is mainly dependent on the speed of conveyance of the recording medium by the conveyance mechanism 57. Here, a difference in the number of discharges during scanning could be said to impact whether or not the above-described blank sections occur. In a case where there are many discharges during scanning, basically, the duration of time from after a given ink droplet strikes the recording medium until when an ink droplet next strikes the recording medium could be said to be short. In such a case, an air flow (wind) stirred up in the vicinity of the surface of the recording medium, upon impact, by the ink droplet striking before causes the ink droplet next attempting to strike to drift somewhat. When each of the ink droplets experiences such a phenomenon, the consequence is that each of the ink droplets experiences a striking error and blank sections could occur. Such blank sections can be called "wind ripples" or the like, and appear on the recording medium in the form of curving streaks.

In a case where there are few discharges during scanning, however, then basically the duration of time from after a given ink droplet strikes the recording medium until when an ink droplet next strikes the recording medium could be said to be long. Therefore, the impact of the air flow (wind) is reduced and the wind ripples are less likely to occur. In other words, it could be said that the blank sections (wind ripples) are more likely to occur in a case where there are many discharges during scanning, and conversely that the blank sections (wind ripples) are more likely to occur in a case where there are few discharges during scanning. In any case, the user is able to select the print resolution via the UI screen. The print resolutions that the user is able to select via the UI screen can be divided between print resolutions at which the above-described number of discharges during scanning is a predetermined reference value or higher and print resolutions at which the number of discharges during scanning is less than this reference value. Below, the print resolutions at which the number of discharges during scanning is the reference value or lower are called a "first recording method" and the print resolutions at which the number of discharges during scanning is less than the reference value are called a "second recording method".

Rather than directly selecting the print resolution via the UI screen, the user may also in some instances, for example, indirectly select the print resolution by selecting one print mode from among a plurality of print modes having different print resolutions. Examples could include a high-speed mode where the print speed is highest, followed by a standard mode where the print speed is high, and a low-speed mode where the print speed is lowest. Such print modes each execute printing at mutually different print resolutions. As such, for example, it may be understood that the high-speed mode and the standard mode fall under the "second recording method" and the low-speed mode falls under the "first recording method".

Monochromatic printing is printing where only the K ink is used, and color printing is printing where not only the K ink is used but so are a variety of different chromatic inks, such as C, M, and Y. It is expected that monochromatic printing would be selected in a case where, for example, characters or figures are being printed, and black sections in a solid image that are meant to be filled in with the K ink are conspicuous, as are "voids" of characters printed with the K ink. It is expected that color printing, meanwhile would be selected in a case where a photograph or the like is being printed; compared to monochromatic printing, blank sections, if even existent at all, could be said to be less conspicuous.

In a step S110, the image acquisition unit 13a acquires image data 22 (bitmap data) that has been selected as desired by the user as an image for printing onto the recording medium. The image data 22 is, for example, generated in advance by a predetermined application software and saved on the HDD 20 or the like. Alternatively, it may be understood that the image acquisition unit 13*a* acquires (downloads) the image data 22 from an external server or the like connected to a network (not shown).

In a step S120, the image processing unit 13*b* runs the image data 22 through a resolution conversion. That is to say, the resolution of the image data 22 is converted so that the resolution of the image data 22 matches the print resolution received in the step S100, and also the size of the recording medium is consulted and the number of pixels is adjusted to the number of pixels required for printing.

In a step S130, the image processing unit 13*b* performs a color conversion process on the image data 22 having undergone the step S120. More specifically, the image processing unit 13*b* converts the color system of the image data 22 to an ink color system employed by the printer (second apparatus 50). For example, in a case where the image data 22 is RGB data that has gradation values (for example, 256 gradations of 0 to 255) for red (R), green (G), and blue (B) for every pixel, then the image processing unit 13*b* converts the RGB values of every pixel of the image data 22 to CMYK values, which are a combination of respective amounts of ink (ink densities; for example, 256 gradations of 0 to 255) for C, M, Y, and K. The color conversion process can be executed by consulting a look-up table (LUT) where relationships of correspondence between RGB and CMYK have been previously established. The LUT is stored in a predetermined storage area (for example, the HDD 20 or the ROM 53). In a case where a setting for monochromatic printing has been received in the step S100, then the values for every pixel in the image data 22 are converted to an amount of ink for only K in this step S130. The gradation values belonging to each of the pixels in the image data 22 that has undergone the process of this step S130 are applicable as one example of the "gradation values of ink colors" in the claims.

In a step S140, the dot allocation unit 13*c* performs a dot allocation process for the image data 22 having undergone the step S130. That is, performed is a process where an amount of ink for every ink color belonging to each of the pixels of the image data 22 is allocated to a recording rate of every one of the ink droplets of a plurality of different sizes. The dot allocation process is executed by consulting a dot allocation table which defines relationships of conversion between amounts of ink and recording rates for every one of the ink droplets of each of the sizes. In the step S140, the dot allocation unit 13*c* first determines where a "first discharge mode" or a "second discharge mode" is meant to be executed, in accordance with the content of the print conditions received in the step S100 (step S142).

The first discharge mode signifies in general a print control with which, in a case where an amount of ink (gradation value) belongs to a maximum value-side partial range comprising a maximum value, then the ink droplet to be discharged by the print head 62 is understood to be an ink droplet of a first size or an ink droplet of a size smaller than the first size, and in a case where an amount of ink (gradation value) belongs to a range more to a minimum value side than the aforementioned partial range, then the ink droplet to be discharged by the print head 62 is understood to be only an ink droplet of the first size.

The second discharge mode signifies in general a print control with which, in a case where an amount of ink (gradation value) belongs to a minimum value-side second partial range comprising a minimum value, then the ink droplet to be discharged by the print head 62 is understood to be an ink droplet of a size smaller than the first size. It is here understood that, for example, the ink droplets of the first size are the L-sized ink droplets (large dots), and the ink droplets of a size smaller than the first size are the M-sized ink droplets (medium dots).

In the present embodiment, the dot allocation unit 13*c* decides to execute the first discharge mode (proceeds to a step S144) in a case where the first recording medium has been set in the step S100, and decides to execute the second discharge mode (proceeds to a step S146) in a case where the second recording medium has been set in the step S100. Alternatively, the dot allocation unit 13*c* decides to execute the first discharge mode (proceeds to the step S144) in a case where the first recording method has been set in the step S100, and decides to execute the second discharge mode (proceeds to the step S146) in a case where the second recording method has been set in the step S100. Alternatively, the dot allocation unit 13*c* decides to execute the first discharge mode (proceeds to the step S144) in a case where the monochromatic printing has been set in the step S100, and decides to execute the second discharge mode (proceeds to the step S146) in a case where the color printing has been set in the step S100. That is to say, in the present embodiment, the first discharge mode is selected in a case where the printing conditions are such that the above-described blank sections are likely to occur or that the blank sections are expected to be conspicuous.

In the step S144, the dot allocation unit 13*c* performs the dot allocation process by consulting a first table (dot allocation table T1) for the first discharge mode. In the step S146, in turn, the dot allocation unit 13*c* performs the dot allocation process by consulting a second table (dot allocation table T2) for the second discharge mode. The dot allocation tables T1, T2 are stored in a predetermined storage area (for example, the HDD 20 or the ROM 53).

Figure 3:
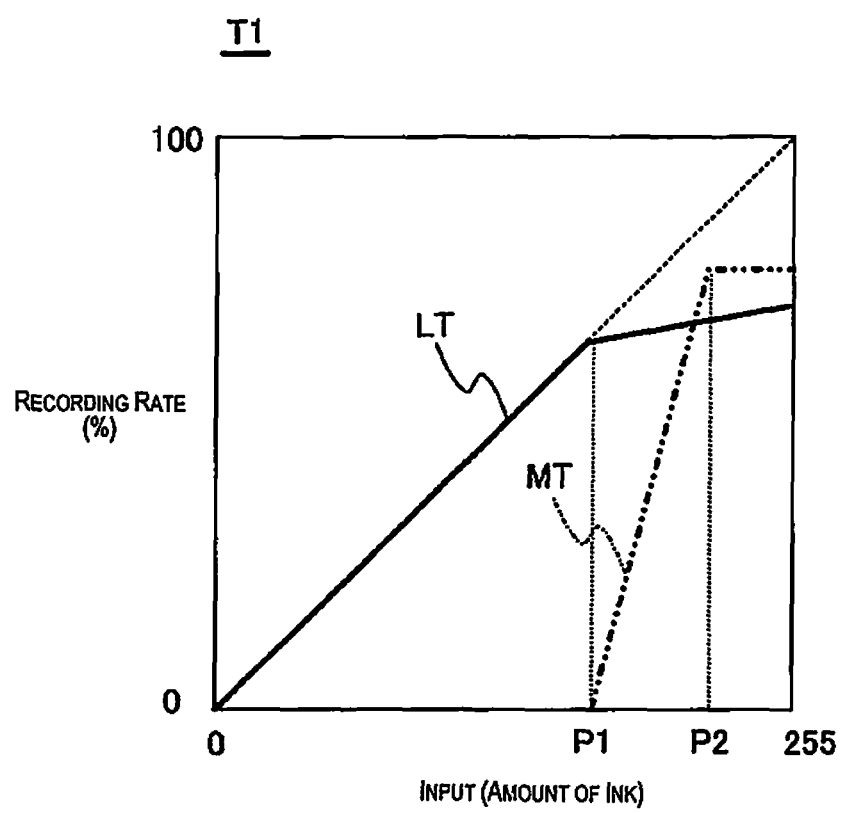
FIG. 3 is a drawing for illustratively exemplifying a dot allocation table for a first discharge mode.

FIG. 3 is one example of the dot allocation table T1 for the first discharge mode. The dot allocation table T1 is a table (or mathematical function) where the input (horizontal axis) is an amount of ink (0 to 255) and the output (vertical axis) is a recording rate (0 to 100%) for the dot. For example, the rate of coverage by dots inside a unit region in the recording medium is envisioned as the recording rate for the dots. The dot allocation table T1 is constituted of a table LT (solid line) defining the recording rate for large dots and a table MT (double-dot chain line) defining the recording rate for medium dots. Consulting the dot allocation table T1 of such description, the dot allocation unit 13*c* converts an amount of ink for one type of ink (for example, K) belonging to one pixel of the image data 22 having undergone the step S130 to a recording rate for large dots or a recording rate for medium dots. The configuration of such description is performed for the amounts of ink for all of the types of ink belonging to all of the pixels.

One feature of the dot allocation table T1 resides in that the recording rate (MT) for medium dots is generated only in the range of input gradation values P1 to 255. The gradation values P1 to 255 fall under the maximum value-side partial range comprising the maximum value (255). More specifically, the recording rate (MT) for medium dots increases with a constant slope in a high gradation-side range of gradation values P1 to P2 (where P1<P2<255), and takes a constant value in a range of gradation values P2 to 255. Another feature of the dot allocation table T1 resides in that the recording rate (LT) for large dots is generated across the entire range (but input gradation value=0 is excluded) of input gradation values. More specifically, the recording rate (LT) for the large dots increases at a constant slope in the range of minimum value (0) to P1, and takes a slope smaller than before in a range of gradation values P1 to 255. Here, the gradation value P1, which is a generating point for the recording rate (MT) for the medium dots, is conceptually a gradation value corresponding to a coverage rate of such an extent that the user views all of an image region possessing a certain breadth as being covered with ink when only the large dots are formed on the recording medium with respect to this region. In other words, rather than necessarily meaning complete coverage with ink, the gradation value P1 is a gradation value corresponding to a recording rate of such an extent that it could be said that the impression, when seen by the user, is one of substantially complete coverage with ink (i.e., could be recognized as being a solid image). The gradation value P1 is a value corresponding to, for example, about 60% in a case where the range of gradation values 0 to 255 is normalized to 0 to 100%.

Figure 4:
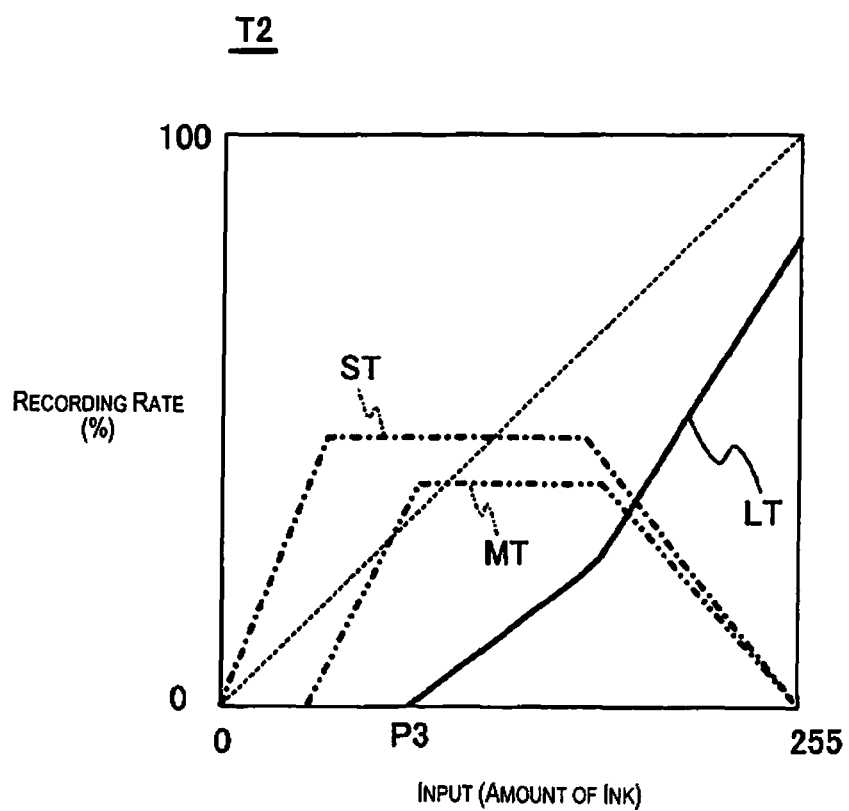
FIG. 4 is a drawing for illustratively exemplifying a dot allocation table for a second discharge mode.

FIG. 4 is one example of the dot allocation table T2 for the second discharge mode. The manner in which the dot allocation table T2 differs from the dot allocation table T1 shall now be described. The dot allocation table T2 is constituted of a table LT (solid line) defining the recording rate for large dots, a table MT (double-dot chain line) defining the recording rate for medium dots, and a table ST (single-dot chain line) defining the recording rate for small dots. More specifically, as the input gradation value increases from the minimum value (0) to the maximum value (255), the dot allocation table T2 first generates only the recording rate (ST) for small dots, then also generates the recording rate (MT) for medium dots, and next, at a given gradation value P3 or higher, also generates the recording rate (LT) for large dots. According to the dot allocation table T2, an image having a comparatively lower ink density is reproduced making heavy usage of comparatively small dots, and an image having a comparatively higher ink density is reproduced making heavy usage of comparatively larger dots. In the dot allocation table T2, the range of input gradation values 0 to P3 is one example of a "second partial range" in the claims. The gradation value P3 is, for example, a value lower than the gradation value P1 (FIG. 3).

In a step S150, the image processing unit 13b performs a halftone process on the image data 22 having undergone the step S140. The halftone process can be performed by, for example, dithering, error diffusion, or the like, but here dithering using a dither mask (not shown) is employed by way of example. The dither mask is stored in a predetermined storage area (for example, the HDD 20 or the ROM 53). In the image data 22 having undergone the step S140, the recording rates (recording rate for the large dots, recording rate for the medium dots, recording rate for the small dots) for at least some of the dots among the dots of a plurality of sizes are defined for each of the types of ink for each of the pixels. Therefore, for every type of ink and for every pixel overlapping when the dither mask and the image data 22 are superimposed together, the image processing unit 13b compares the recording rate for the dots of each of the sizes and a threshold value (for example, 0 to 255) stored in the dither mask, and generates halftone data (quaternary data) determining whether to form a large, medium, or small dot (large dot ON, medium dot ON, or small dot ON) or not to form any dots (dots OFF). The halftone data is also called print data.

The specific method for the halftone process is not particularly limited; for example, the technique disclosed in Japanese laid-open patent publication 2011-223520 may be employed. Alternatively, the recording rate for the large dots, the recording rate for the medium dots, and the recording rate for the small dots all having undergone the dot allocation process (step S140) with respect to a given type of ink for a given pixel may be respectively compared with a threshold value TH of the dither mask as follows, where the recording rate for the large dots=LR, the recording rate for the medium dots=MR, and the recording rate for the small dots=SR. Here, the threshold values TH are understood to have been normalized to a numerical range (0 to 100%) similar to that of LR, MR, and SR.

The image processing unit 13b first calculates the respective numerical values of LR, LR+MR, and LR+MR+SR. Next, large dot ON is decided when TH≤LR,
medium dot ON is decided when LR<TH≤LR+MR,
small dot ON is decided when LR+MR<TH≤LR+MR+SR, and
dot OFF is decided when LR+MR+SR<TH.

The decision would be small dot ON according to the above example if LR=0%, MR=10%, SR=40%, and TH=35%.

In a step S160, the transfer unit 13d sorts the print data obtained by the process of the step S150 into the order that should be transfer to the print head 62, and thereupon transfers same sequentially to the second apparatus 50 side via the transfer path 70. According to the process of such sorting, the questions of at which timing the dots of each of the sizes defined in the print data (more accurately, information indicative of the formation of the dots of each of the sizes) are to be discharged by which of the nozzles of the print head 62 is determined in accordance with the pixel position and ink type thereof. The result is that an image where the image data 22 is presented is printed onto the recording medium at the second apparatus 50 side, based on the print data.

In other words, when the process goes through the step S144, then the discharge of the ink droplets as the first discharge mode (discharge or large dots and of medium dots) is executed, and when the process goes through the step S146, then the discharge of the ink droplets as the second discharge mode (discharge of large dots, medium dots, and small dots) is executed. It shall be readily understood that the actual printing is executed under the variety of print conditions received in the step S100.

Thus, in the present embodiment, when the dot allocation table T1 generates the recording rate for the large dots over the total gradation range (excluding when input gradation value=0) of input, then this causes the image presented by the image data 22 to be reproduced basically by the large dots on the recording medium in the first discharge mode. Therefore, the occurrence of blank sections is effectively curbed and image quality is improved in a print conditions (a case where the first recording medium has been selected, or a case where the first recording method has been selected) where the blank sections are prone to occur or in print conditions (a case where the monochromatic printing has been selected) where the blank sections are expected to be conspicuous. In other words, the blank sections are reduced by heavy usage of the large dots, even on the first recording medium that is resistant to ink bleeding. The blank sections are also reduced (occurrence of the wind ripples is curbed) by heavy usage of the large dots in a case where the first recording method, where wind ripples are likely to occur, is employed. Because the weight of one droplet is heavy with the large droplets, it could be said that a striking error is less likely to occur even when the air flow (wind) as described above is received. There is also less of the blank sections that are conspicuous in the monochromatic images. The dot allocation table T1 also generates the recording rates for the medium dots along with the recording rates for the large dots at the gradation value P1 (FIG. 3) and higher. Therefore, in the first discharge mode, characters that are exclusively defined at the maximum value 255 or a density close to the maximum value 255 in the image data 22 (when converted to the amount of ink) are reproduced not only with the large dots but also with the medium dots. This curbs voids of some of the characters in the result of printing and also upholds the quality of the characters, as shall be described with reference to FIGS. 5 and 6 below.

Figure 5:
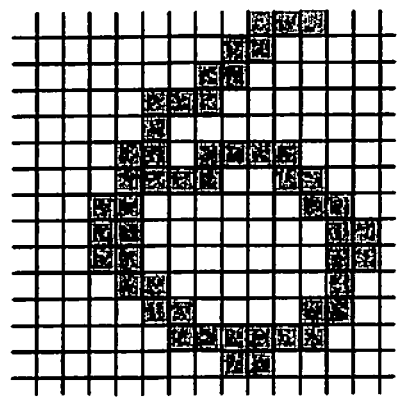
FIG. 5 is a drawing for schematically illustrating an example of a part of image data.

FIG. 5 schematically illustrates an example of a part of the image data 22. The image data 22 illustrated in FIG. 5 is in the state of having undergone the color conversion process of the step S130; for example, each of the pixels coated with grey in the drawing, there is an amount of ink for only K (an amount of ink that is the gradation value P1 or higher), and other than K, the amounts of ink for C, M, and Y are 0. Each of the white pixels in the drawing is understood to also have an ink amount of 0 for C, M, Y, and K. FIG. 5 represents one character (the number "6") included in the image data 22. For such image data 22, a case where the dot allocation process (step S144) with consultation of the dot allocation table T1 and the halftone process (step S150) have been performed is envisioned.

Figure 6A:
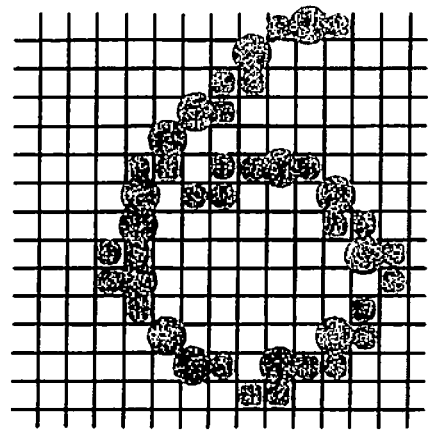
FIGS. 6A and 6B are drawings for schematically illustrating examples of a part of print data.
Figure 6B:
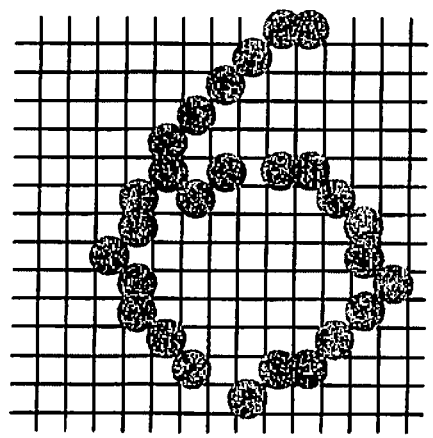

FIG. 6A schematically illustrates an example of (some of) the print data from after the step S144 and the step S150 have been performed for the image data 22 illustrated in FIG. 5. In FIG. 6A, for the sake of ease of understanding, the positions of pixels defined as being large dot ON in the print data are marked with a comparatively large "●" of grey color, while the positions of pixels defined as being medium dot ON in the print data are marked with a "●" a grey color that is smaller than the "●" for large dots. FIG. 6B, in turn, is a comparative example with respect to FIG. 6A, and schematically illustrates an example of (a part of) the print data from after the step S144 and the step 150 have been performed, in a case where the allocation table T1 is assumed to be one that defines only the recording rate for the large dots. As with FIG. 6A, FIG. 6B uses a comparatively large "●" of grey color to mark the positions of pixels defined as being large dot ON in the print data. In FIG. 6B, the only dots that occur are large dots.

As becomes clear from a comparison of FIGS. 5 and 6, all of the pixels with which the amount of ink for K is defined in the color-converted image data 22 is not necessarily dot ON in the state of the print data. Some of the pixels with which the amount of ink for K is defined in the image data 22 are dot OFF. Thus, for the state to actually be dot OFF in a pixel where a value is present at the point of time where the amount of ink was defined is called a "void" of a dot. The occurrence of such voids is based mainly on the result of considering the duty limit value in the recording medium.

The "duty limit value" is an upper limit for the amount of ink that can be applied per unit area of the recording medium; the print data is generated so as to abide by a previously established duty limit value. In other words, even were all pixels to be define the maximum value (255) in the state of the image data 22 where each of the pixels defines the amount of ink, the duty limit value would still be exceeded when the formation of the largest-sized dots (large dots) is allowed at the positions of all pixels without alteration. Therefore, the dot allocation tables are designed in advance so as to avoid the situation where the recording rate for the large dots reaches 100% at all pixels. As such, even in a result of printing for a solid image where a region of a given breadth is filled, such voids could exist and yet such voids will not be conspicuous and will substantially not be visible to the user. An image drawn with lines only having a narrow width, as with characters, however, has a conspicuous presence of such voids, and therefore the presence of these voids could be said to readily lead to deterioration of quality.

FIGS. 6A and 6B shall be compared next. According to this comparison, the same image (a character represented within the image data 22) is represented by large dots and medium dots in FIG. 6A, and is represented by only large dots in FIG. 6B. Therefore, the sum of the amount of ink of large dots and medium dots illustrated in FIG. 6A and the sum of the amount of ink of large dots illustrated in FIG. 6B are substantially equal, but between the sum of the numbers of large dots and medium dots illustrated in FIG. 6A and the sum of the number of large dots illustrated in FIG. 6B, the former is greater. In other words, FIG. 6A has fewer of the "voids" than FIG. 6B. That is to say, in the present embodiment, employing the dot allocation table T1 with which a recording rate for not only the large dots but also for the medium dots (step S144) in a high-density region of a certain extent makes it possible to obtain a higher-quality result of printing of characters or the like, where the number of "voids" of dots has been curbed.

Also, according to the present embodiment, unlike the dot allocation table T1, the dot allocation table 1'2 preferentially generates a recording rate for smaller-sized dots the more the input is to the low gradation value side. Therefore, in the second discharge mode, the image represented by the image data 22 can be represented by more of the small dots and medium dots. An image quality with less graininess (conspicuousness of dots) and richer tone is therefore obtained in print conditions (a case where the second recording medium has been selected or a case where the second recording method has been selected) where such blank sections are less like to occur to begin with or in print conditions (a case where the color printing has been selected) where the blank sections are expected to be scarcely conspicuous.

3. Modification Examples

The present invention is not limited to the embodiments and examples described above, but rather can be embodied in a variety of modes within a scope that does not depart from the essence thereof; for example, modifications such as described below are also possible. The disclosure of the present invention also encompasses configurations where the above-described embodiment and each of the modification examples are combined as appropriate.

In the description above, the ink droplets of the first size are the large dots, and the ink droplets of a size smaller than the first size are the medium droplets. The ink droplets of a size smaller than the first size may, however, be the small dots. Also, the ink droplets of the first size may be the medium dots, the ink droplets of a size smaller than the first size then being the small dots. That is to say, the size of the ink droplets that the print head 62 is capable of discharging is not limited to being of three different types, as described above, but rather may be of two different types or may be of four or more different types.

The above description has the flow proceeding from the step S142 to the step S144 (FIG. 2) in a case where any of the following holds true: the first recording medium, which is resistant to ink blurring, has been set; the first recording method, which has a relatively large number of discharges during scanning, has been set; or the monochromatic printing has been set. However, the present invention is not bound by such ideas. For example, the flow may proceed to the step S144 when all of the conditions of the first recording medium having been set, the first recording method having been set, and the monochromatic printing having been set hold true, the flow then proceeding to the step S146 in other instances. Alternatively, the flow may proceed to the step S144 when two or more conditions out of these conditions hold true, the flow then proceeding to the step S146 in other instances. Alternatively, the flow may proceed to the step S144 when one (for example, the first recording medium having been set) of these conditions is understood to be an essential condition and at least one of the other conditions holds true.

The specific content of the dot allocation tables T1, T2 is not limited to what is depicted, and it need only be possible to respectively implement the first discharge mode and second discharge mode described above. Each of the dot allocation tables T1, T2 also need not be prepared in advance. For example, the configuration may be such that only a basic dot allocation table (for example, the dot allocation table T2) has been stored in a predetermined storage area, and the dot allocation unit 13c generates the dot allocation table T1 used for the dot allocation process by modifying a part of this basic dot allocation table in the step S144.

The description thus far has been by way of example of a case where the process in FIG. 2 is executed on the first apparatus 10 side, but at least a part of this process may also be performed on the second apparatus 50 side. For example, the configuration may be such that the firmware FW executes the processes of the steps S100 to S150, outputs the print data obtained as a result of these processes to the ASIC 56 (step S160), and executes printing in accordance with the print data.

Also, irrespective of the print conditions that are set (i.e., without the determination made in the step S142), it would also be possible to perform the step S144 at all times and ascertain the print control apparatus or print apparatus (printer) executing the first discharge mode.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A print control apparatus configured to control a print head adapted to discharge ink droplets of a plurality of sizes to execute printing, the print control apparatus comprising:
   a print control unit configured to acquire a gradation value of an ink color based on image data, to determine whether or not to discharge an ink droplet of one of the plurality of sizes based on the gradation value, and to control discharging of the ink droplets by the print head in accordance with determination,
   the print control unit being configured to determine that the ink droplet to be discharged by the print head is the ink droplet of a first size and the ink droplet of a size smaller than the first size when the gradation value belongs to a maximum value-side partial range including a maximum value, and to determine that the ink droplet to be discharged by the print head is only the ink droplet of the first size when the gradation value belongs to a range towards a minimum value-side than the partial range,
   the print control unit being further configured to execute at least:
      a first discharge mode, for determining that the ink droplet to be discharged by the print head is the ink droplet of the first size or the ink droplet of the size smaller than the first size when the gradation value belongs to the partial range, and determining that the ink droplet to be discharged by the print head is only the ink droplet of the first size when the gradation value belongs to the range towards the minimum value-side than the partial range; and
      a second discharge mode, for determining that the ink droplet to be discharged by the print head is the ink droplet of the size smaller than the first size when the gradation value belongs to a second partial range further towards the minimum value-side including a minimum value,
   the first discharge mode being executed in a case of using a first recording medium resistant to ink droplet bleeding, and the second discharge mode being executed in a case of using the second recording medium, wherein the first recording medium and the second recording medium differ in how readily an ink droplet that has struck bleeds.

2. The print control apparatus as set forth in claim 1, wherein
   the first discharge mode is further executed in a case of employing a first recording method where there is a greater number of discharges, and the second discharge mode is further executed in a case of employing the second recording method, wherein the first recording method and the second recording method differ in the number of discharges of ink droplets per one scan of the print head.

3. The print control apparatus as set forth in claim 1, wherein
   the first discharge mode is further executed in a case where only black ink is being discharged by the print head, and the second discharge mode is further executed in a case where the black ink and a color ink other than the black ink are being discharged by the print head.

4. A print control method for controlling a print head adapted to discharge ink droplets of a plurality of sizes to execute printing, the print control method comprising:
  acquiring a gradation value of an ink color based on image data;
  determining whether or not to discharge an ink droplet of one of the plurality of sizes based on the gradation value; and
  controlling discharging of the ink droplets by the print head in accordance with determination,
  the determining of whether or not to discharge the ink droplet including determining that the ink droplet to be discharged by the print head is the ink droplet of a first size and the ink droplet of a size smaller than the first size when the gradation value belongs to a maximum value-side partial range including a maximum value, and determining that the ink droplet to be discharged by the print head is only the ink droplet of the first size when the gradation value belongs to a range outside the partial range,
  the determining of whether or not to discharge the ink droplet further including executing at least:
    a first discharge mode, for determining that the ink droplet to be discharged by the print head is the ink droplet of the first size or the ink droplet of the size smaller than the first size when the gradation value belongs to the partial range, and determining that the ink droplet to be discharged by the print head is only the ink droplet of the first size when the gradation value belongs to the range towards the minimum value-side than the partial range; and
    a second discharge mode, for determining that the ink droplet to be discharged by the print head is the ink droplet of the size smaller than the first size when the gradation value belongs to a second partial range further towards the minimum value-side including a minimum value,
  the first discharge mode being executed in a case of using a first recording medium resistant to ink droplet bleeding, and the second discharge mode being executed in a case of using the second recording medium, wherein the first recording medium and the second recording medium differ in how readily an ink droplet that has struck bleeds.

5. A non-transitory computer-readable medium that stores a print control program for controlling a print head adapted to discharge ink droplets of a plurality of sizes to execute printing, the print control program includes instructions for:
  acquiring a gradation value of an ink color based on image data;
  determining whether or not to discharge an ink droplet of one of the plurality of sizes based on the gradation value; and
  controlling discharging of the ink droplets by the print head in accordance with determination,
  the determining of whether or not to discharge the ink droplet including determining that the ink droplet to be discharged by the print head is the ink droplet of a first size and the ink droplet of a size smaller than the first size when the gradation value belongs to a maximum value-side partial range including a maximum value, and determining that the ink droplet to be discharged by the print head is only the ink droplet of the first size when the gradation value belongs to a range outside the partial range,
  the determining of whether or not to discharge the ink droplet further including executing at least:
    a first discharge mode, for determining that the ink droplet to be discharged by the print head is the ink droplet of the first size or the ink droplet of the size smaller than the first size when the gradation value belongs to the partial range, and determining that the ink droplet to be discharged by the print head is only the ink droplet of the first size when the gradation value belongs to the range towards the minimum value-side than the partial range; and
    a second discharge mode, for determining that the ink droplet to be discharged by the print head is the ink droplet of the size smaller than the first size when the gradation value belongs to a second partial range further towards the minimum value-side including a minimum value,
  the first discharge mode being executed in a case of using a first recording medium resistant to ink droplet bleeding, and the second discharge mode being executed in a case of using the second recording medium, wherein the first recording medium and the second recording medium differ in how readily an ink droplet that has struck bleeds.

* * * * *